(12) United States Patent
Drabarek et al.

(10) Patent No.: US 8,077,323 B2
(45) Date of Patent: Dec. 13, 2011

(54) OPTICAL FIBER PROBE FOR AN INTERFEROMETRIC MEASURING DEVICE AND METHOD FOR MANUFACTURING AN OPTICAL FIBER PROBE

(75) Inventors: Pawel Drabarek, Tiefenbronn (DE); David Rychtarik, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 322 days.

(21) Appl. No.: 11/974,412

(22) Filed: Oct. 11, 2007

(65) Prior Publication Data
US 2008/0144040 A1   Jun. 19, 2008

(30) Foreign Application Priority Data
Oct. 12, 2006   (DE) .................... 10 2006 048 316

(51) Int. Cl.
*G01B 9/02* (2006.01)
(52) U.S. Cl. .................... 356/480; 356/477
(58) Field of Classification Search .......... 356/477–480, 356/482; 385/12
See application file for complete search history.

(56) References Cited

U.S. PATENT DOCUMENTS

| | | | | |
|---|---|---|---|---|
| 4,994,791 A * | 2/1991 | Taylor | | 356/480 |
| 5,237,630 A * | 8/1993 | Hogg et al. | | 385/12 |
| 5,420,688 A * | 5/1995 | Farah | | 356/477 |
| 5,557,406 A * | 9/1996 | Taylor et al. | | 356/477 |
| 5,892,582 A * | 4/1999 | Bao et al. | | 356/480 |
| 5,990,474 A * | 11/1999 | Atia et al. | | 250/234 |
| 6,741,355 B2 * | 5/2004 | Drabarek | | 356/482 |
| 7,426,036 B2 * | 9/2008 | Feldchtein et al. | | 356/479 |
| 2005/0244096 A1 * | 11/2005 | Jeffers et al. | | 385/15 |

FOREIGN PATENT DOCUMENTS

DE   10244553   2/2004

* cited by examiner

Primary Examiner — Patrick J Connolly
(74) Attorney, Agent, or Firm — Kenyon & Kenyon LLP

(57) ABSTRACT

An optical fiber probe for an interferometric measuring device having a mechanical receptacle into which an optical fiber is inserted, having a fiber end piece which projects over the mechanical receptacle and contains optical components for guiding a measuring beam onto a measuring object, and having a reflection zone situated in the fiber for partial reflection of a light beam guided in the fiber. The reflection zone is situated in the fiber end piece. A method for manufacturing such an optical fiber probe. The fiber is separated at a predefined point, a partially reflecting coating is applied to at least one of the separation sites, and the two fiber parts are subsequently reconnected. The optical fiber probes may thus be manufactured with a long fiber end piece, which makes it possible to interferometrically measure deep cavities having a small diameter.

9 Claims, 1 Drawing Sheet

OPTICAL FIBER PROBE FOR AN INTERFEROMETRIC MEASURING DEVICE AND METHOD FOR MANUFACTURING AN OPTICAL FIBER PROBE

FIELD OF THE INVENTION

The present invention relates to an optical fiber probe for an interferometric measuring device having a mechanical receptacle into which an optical fiber is inserted, having a fiber end piece which projects over the mechanical receptacle and contains the optical components for guiding a measuring beam onto a measuring object, and having a reflection zone situated in the fiber for partial reflection of a light beam guided in the fiber. The present invention furthermore relates to a method for manufacturing such an optical fiber probe.

BACKGROUND INFORMATION

An interferometric measuring device in which such a fiber probe is used is presented in German Patent No. DE 102 44 553. That document describes an interferometric measuring device for detecting the shape, the roughness, or the distance from the surface of a measured object using a modulation interferometer, to which a short-coherent radiation is supplied by a radiation source and which has a first beam splitter for splitting the supplied radiation into a first partial beam conducted via a first arm and a second partial beam conducted via a second arm, the light phase or light frequency of one of the partial beams being shifted with respect to the other by a modulation device and this beam passing through a delay segment, the two partial beams being subsequently combined in a further beam splitter of the modulation interferometer, having a measuring probe spatially separated from the modulation interferometer and connected or connectable thereto via a fiber optic device in which the combined partial beams are split into a measuring beam conducted to the surface by a fiber optic probe device having an oblique object-side exit surface and a reference beam and in which the measuring beam ($r_1(t)$) reflected on the surface and the reference beam ($r_2(t)$) reflected on a reference plane are superimposed, and having a receiving device and an analyzing unit for converting the radiation supplied thereto into electrical signals and for analyzing the signals on the basis of a phase difference. The angle of inclination (y) of the exit surface is at least 46° with respect to the normal to the optical probe axis.

According to FIGS. 5 and 6 shown in the document, the oblique exit surface of an object-side optical fiber probe unit projects over a tube-shaped receptacle, so that the outstanding optical fiber probe unit, i.e., the fiber end piece, can be introduced into narrow cavities for interferometric measuring functions, for example.

The depth of the cavity to be tested is limited by the length of the fiber end piece. In optical fiber probe units, the length of the fiber end piece for a typical fiber diameter of 20 µm is approximately 2 mm.

As FIGS. 3 through 6 of the above-named document show, a semitransparent area, known as a reference layer, is introduced into the fiber and splits the incident light beam into a measuring beam and a reference beam, the reference beam being reflected back into the fiber. Such a reference layer is currently manufactured in such a way that the fiber is divided into two parts and each part is glued onto a so-called ferrule. The end face of a ferrule with the glued-in fiber is provided with a partially reflecting coating; subsequently both ferrules are connected using a guide sleeve in such a way that the unreflected component of the incident light is able to pass into the second part of the fiber. The two ferrules together with the guide sleeve form a mechanical receptacle for the fiber. The reference layer is located within the mechanical receptacle.

The maximum distance between the reference layer and the focus of the measuring beam is predefined by the path difference registered in the upstream interferometer. For typical interferometer systems this maximum distance is approximately 25 mm. The length of the fiber end piece which may be introduced into a bore hole for measuring purposes is limited to this value less the distance between the reference layer and the end of the mechanical receptacle. Extending the fiber end piece is only possible after appropriately modifying the upstream interferometer, which, however, is complicated and expensive.

Deeper bore holes may only be tested if they have such a large diameter that the mechanical receptacle may also be introduced, or alternative systems having a small tube with built-in optical components, for example, may be used, the above-named systems also having a diameter greater than 1.3 mm.

It is therefore an object of the present invention to provide an optical fiber probe which enables interferometric testing of cavities having small diameters and great depths with high measuring accuracy. The present invention furthermore relates to a method for manufacturing such an optical fiber probe.

SUMMARY OF THE INVENTION

The object of the present invention concerning the optical fiber probe is achieved in that the reflection zone is situated in the fiber end piece. The reflection zone at which the incident light beam is split into a reference beam and a measuring beam may thus be situated in the immediate proximity of the fiber tip and thus of the focal point of the measuring beam. The distance between the focal point and the reflection zone may be selected in such a way that it is adapted to the upstream interferometer. Since the reflection zone is now located in the fiber end piece, the latter may, depending on the mechanical strength of the fiber, be designed to have any desired length without any modification of the upstream interferometer being necessary. Therefore, compared with fiber probes known today, considerably deeper cavities having small diameters into which only the fiber end piece, but not the mechanical receptacle of the fiber, may be introduced, may be interferometrically tested.

In a preferred embodiment variant of the present invention, it is provided that the reflection zone is formed as a reflection coating between two connected fiber pieces. Such semitransparent reflection coatings may be manufactured cost-effectively.

If the connection of the fiber pieces is implemented by gluing or fusing the fiber pieces together, a fiber end piece is obtained, which has approximately the same mechanical stability as a continuous fiber end piece. The fiber pieces are securely attached to each other, so that the light beam may pass from one fiber piece into the other with minimum losses.

On the other hand, if the reflection zone is designed as a Bragg grating, the fiber does not have to be separated in the area of the fiber end piece for introducing a reflection zone and preserves its original mechanical stability. The Bragg grating may be impressed on the fiber from the outside.

A partial reflection of the incident light beam in the fiber end piece may be achieved by designing the reflection zone as a change in the refractive index. The portion of the reflected radiation relative to the incident radiation is a function of the change in the refraction index. A change in the refraction index may be achieved, for example, by introducing defects in the fiber core in a controlled manner, for example, in the form of an air bubble.

By adjusting the distance between the reflection zone and a focus of the measuring beam to a path difference between two partial beams registered in an interferometer upstream from the optical fiber probe, the optical fiber probe may be adjusted to existing interferometers. No complex and cost-intensive modification of the interferometer needs to be undertaken.

The object of the present invention concerning the method is achieved in that the fiber is separated at a predefined point, a partially reflecting coating is applied to at least one of the separation sites, and the two fiber parts are subsequently reconnected. The method makes it possible to introduce a reflection zone into the fiber end piece in a cost-effective manner without any noticeable impairment of the stability of the fiber. The distance from the reflection zone to the fiber tip may be selected freely according to the requirements of the upstream interferometer. The fiber pieces may be aligned to each other exactly when connecting them, so that a passage of light may be implemented with minimum losses.

DETAILED DESCRIPTION

Figure 1:
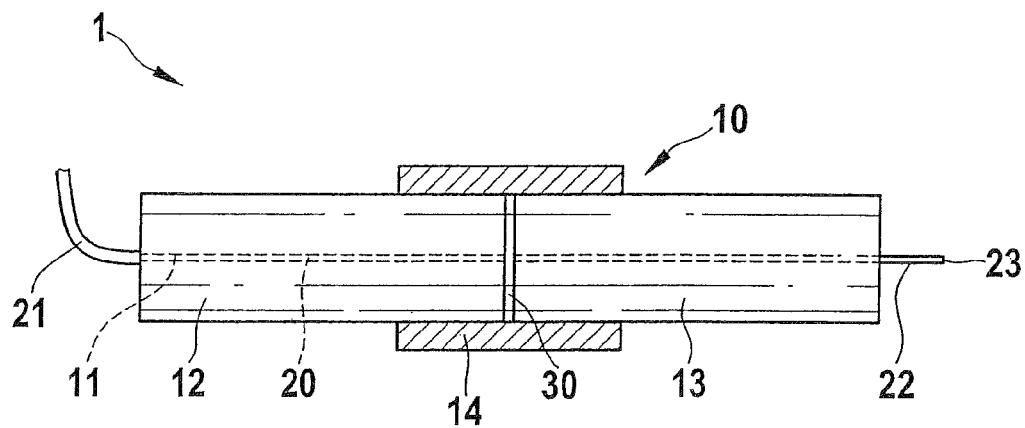
FIG. 1 schematically shows an optical fiber probe according to the related art.

FIG. 1 schematically shows an optical fiber probe 1 as it is used today, for example, for interferometric measurement of injector nozzles of internal combustion engines. An optical fiber 20 is situated in an axial recess 11 of a mechanical receptacle 10. Mechanical receptacle 10 is formed by a first and a second so-called ferrule 12, 13. Ferrules 12, 13 are enclosed by a guide sleeve 14, which aligns the two ferrules 12, 13 to each other and holds them together. On a portion of optical fiber 20 projecting from mechanical receptacle 10, fiber end piece 22, a lens (not depicted) and a mirror (not depicted) are situated on tip 23 of the fiber end piece. Optical fiber 20 is connected to an optical fiber 21. A reflection zone 30 is situated in the interface between the two ferrules 12, 13. In the exemplary embodiment depicted here, reflection zone 30 is designed as a partially reflecting coating, which is applied to the end face of second ferrule 13 and of optical fiber 20 situated therein.

Optical fiber probe 1 is connected to an interferometer (not depicted) via an optical fiber 21. A light beam is supplied to optical fiber 20 from the interferometer via an optical fiber 21. At reflection zone 30, the light beam is split into a transmitted measuring beam and a reflected reference beam. The transmitted measuring beam is supplied to fiber end piece 22 and fiber tip 23, and deflected and focused onto the measuring object via the optical components lens and mirror. The beam reflected from the measuring object is reinjected into fiber tip 23 and guided back to the interferometer via an optical fiber 20 and an optical fiber 21.

Fiber end piece 22 may be used for performing interferometric measurements, for example, in fine bore holes such as provided in injector nozzles for internal combustion engines. For this purpose, fiber end piece 22 is introduced into the bore hole. The diameter of such bore holes on injector nozzles is approximately 150 μm, while fiber end piece 22 typically has a diameter of approximately 20 μm.

The distance between reflection zone 30 and fiber tip 23, i.e., the focus of the measuring beam, is predefined by the upstream interferometer. In interferometers normally used today, it is typically 25 mm. For a length of approximately 10 mm for second ferrule 13, a limitation of the length of fiber end piece 22 to approximately 15 mm results. Small bore holes having a diameter smaller than that of second ferrule 13 may thus be measured only up to a maximum depth of 15 mm. A longer fiber end piece 22 may be used only via a complex modification of the upstream interferometer.

Figure 2:
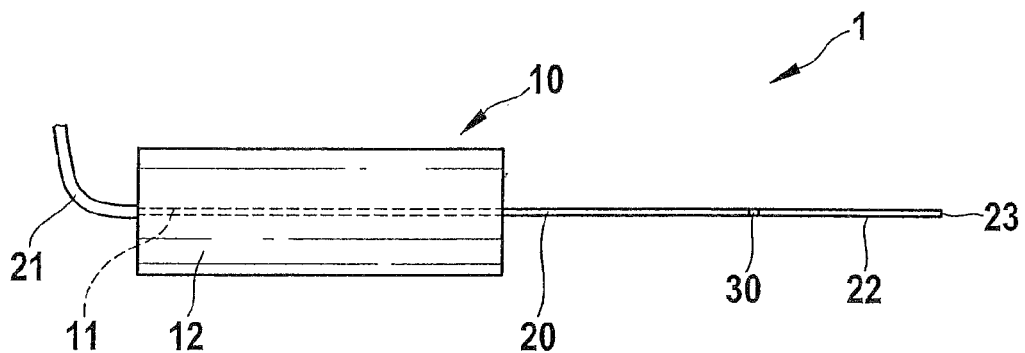
FIG. 2 schematically shows an optical fiber probe having a reflection zone situated in the fiber end piece.

FIG. 2 schematically shows an optical fiber probe 1 having a reflection zone 30 situated in fiber end piece 22 according to the present invention.

Optical fiber 20 is again held in a recess 11 of a mechanical receptacle 10 and connected to an upstream interferometer (not depicted) via an optical fiber 21. In fiber end piece 22, which represents the extension of optical fiber 20 beyond mechanical receptacle 10, a reflection zone 30 and, on fiber tip 23, the optical components mirror and lens (not depicted) are integrated.

In the embodiment variant depicted here, reflection zone 30 is implemented by a partially reflecting coating. To produce this coating, fiber 20 is separated in the area of fiber end piece 22 at the desired point, the coating is applied, and the two fiber parts are reconnected. The connection is implemented using a transparent adhesive, but may also be achieved by fusing the two fiber parts.

Another option for applying a reflection zone is a Bragg grating applied to the fiber end piece from the outside. The advantage of a Bragg grating is that the fiber does not have to be separated.

In principle, any defect in the fiber core results in a reflection. Therefore, defects that do not affect either the shape or the stability of the fiber may be introduced at the desired point of the fiber in a controlled manner. A defect may be a change in the refraction index or an air bubble in the fiber core, for example.

Using the above-described reflection zones, a reference beam may be produced without having to modify the diameter or the geometry of optical fiber probe 1 in the area of the reflection zone. Very long probes, making it possible to inspect deep bore holes having a small diameter, may be implemented independently of the upstream interferometer.

Mechanical receptacle 10 is implemented using only a ferrule 12 or a standardized positioning pin.

Figure 3:
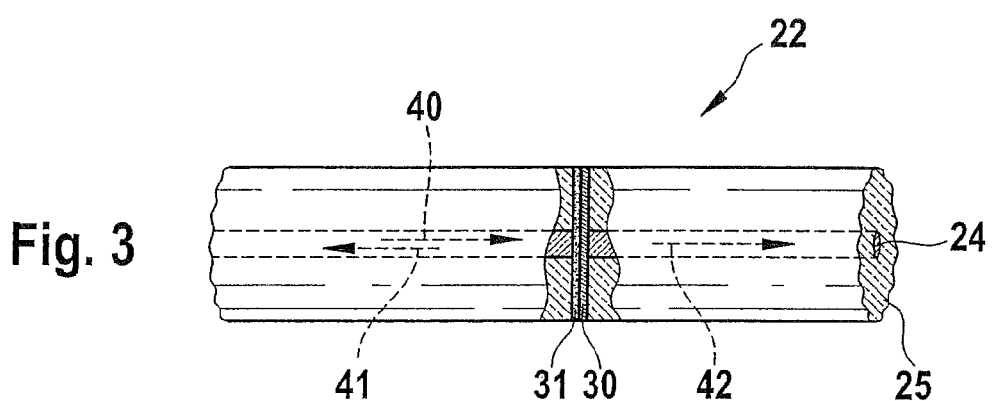
FIG. 3 schematically shows a detail of the fiber end piece having the reflection zone.

FIG. 3 schematically shows a detail of fiber end piece 22 having integrated reflection zone 30.

Fiber end piece 22 is formed from a light-conducting fiber core 24 and a fiber jacket 25 enclosing fiber core 24. A reflection zone 30 is implemented at a connecting point as a partially reflecting coating. The two fiber parts are connected using adhesive 31. Incident light beam 40 is split at reflection zone 30 into a reflecting light beam 41, the reference beam, and a transmitted light beam 42, the measuring beam.

In the monomode fibers used, the fiber core has a diameter of only approximately 9 μm. The partially reflective coating is therefore applied over the entire cross-section surface of the fiber.

What is claimed is:

1. An optical fiber probe for an interferometric measuring device comprising:
   a mechanical receptacle;
   an optical fiber inserted into the mechanical receptacle, the optical fiber including a fiber end piece which projects beyond the mechanical receptacle and contains optical components for guiding a measuring beam onto a measuring object; and a reflection zone situated in the fiber for partial reflection of a light beam guided in the fiber, the reflection zone being situated in the fiber end piece and surrounded only by the fiber end piece.

2. The optical fiber probe according to claim 1, wherein the reflection zone is formed as a reflection coating between two connected fiber pieces.

3. The optical fiber probe according to claim 2, wherein the fiber pieces are one of glued and fused together.

4. The optical fiber probe according to claim 1, wherein the reflection zone is a Bragg grating.

5. The optical fiber probe according to claim 1, wherein the reflection zone is a change in the refractive index.

6. The optical fiber probe according to claim 1, wherein a distance between the reflection zone and a focus of the measuring beam is adjusted to a path difference between two partial beams which is registered in an interferometer upstream from the optical fiber probe.

7. A method for manufacturing an optical fiber probe for an interferometric measuring device including a mechanical receptacle, an optical fiber inserted into the mechanical receptacle and having a fiber end piece which projects beyond the mechanical receptacle and contains optical components for guiding a measuring beam onto a measuring object, and a reflection zone situated in the fiber end piece for partial reflection of a light beam guided in the fiber, the reflection zone surrounded only by the fiber end piece, the method comprising:

separating the fiber at a predefined point into two fiber parts;

applying a partially reflecting coating to at least one separation site; and subsequently reconnecting the two fiber parts.

8. The optical fiber probe according to claim 3, wherein the fiber pieces are glued together, using a transparent adhesive.

9. The method of claim 7, wherein the two fiber parts are glued together, using a transparent adhesive.

* * * * *